(12) United States Patent
Smith

(10) Patent No.: US 8,091,869 B2
(45) Date of Patent: Jan. 10, 2012

(54) ADJUSTABLE SPRING PAD

(76) Inventor: Robin Smith, Tishomingo, OK (US)

( * ) Notice: Subject to any disclaimer, the term of this patent is extended or adjusted under 35 U.S.C. 154(b) by 949 days.

(21) Appl. No.: 12/021,315

(22) Filed: Jan. 29, 2008

(65) Prior Publication Data

US 2009/0189364 A1    Jul. 30, 2009

(51) Int. Cl.
*B60G 11/02* (2006.01)

(52) U.S. Cl. ..................................... 267/52; 280/124.17

(58) Field of Classification Search ............... 267/36.1, 267/52, 53, 260, 265; 280/124.17, 124.11, 280/124.116; 301/137
See application file for complete search history.

(56) References Cited

U.S. PATENT DOCUMENTS 3,144,246 A * 8/1964 Hamlet ........................ 267/52
3,494,609 A * 2/1970 Harbers, Jr. ................. 267/52

* cited by examiner

*Primary Examiner* — Robert Siconolfi
*Assistant Examiner* — Anna Momper

(57) ABSTRACT

An apparatus for aligning a spring and axle may include an adjusting bar member for connecting to the spring, a spring pad member for connecting to the axle and a biasing member for biasing the adjusting bar member in a first and second direction. The biasing member may include a threaded bolt, and the biasing member may include a bracket. The biasing member may include a reduced diameter member, and the bracket may include a first arm and a second arm. The adjusting bar member may be substantially L-shaped, and the adjusting bar member may include a first guiding member and a second guiding member. The adjusting bar member may include a slot between the first and second guiding members, and the spring pad member may include a concave curved surface to cooperate with the axle housing.

1 Claim, 5 Drawing Sheets

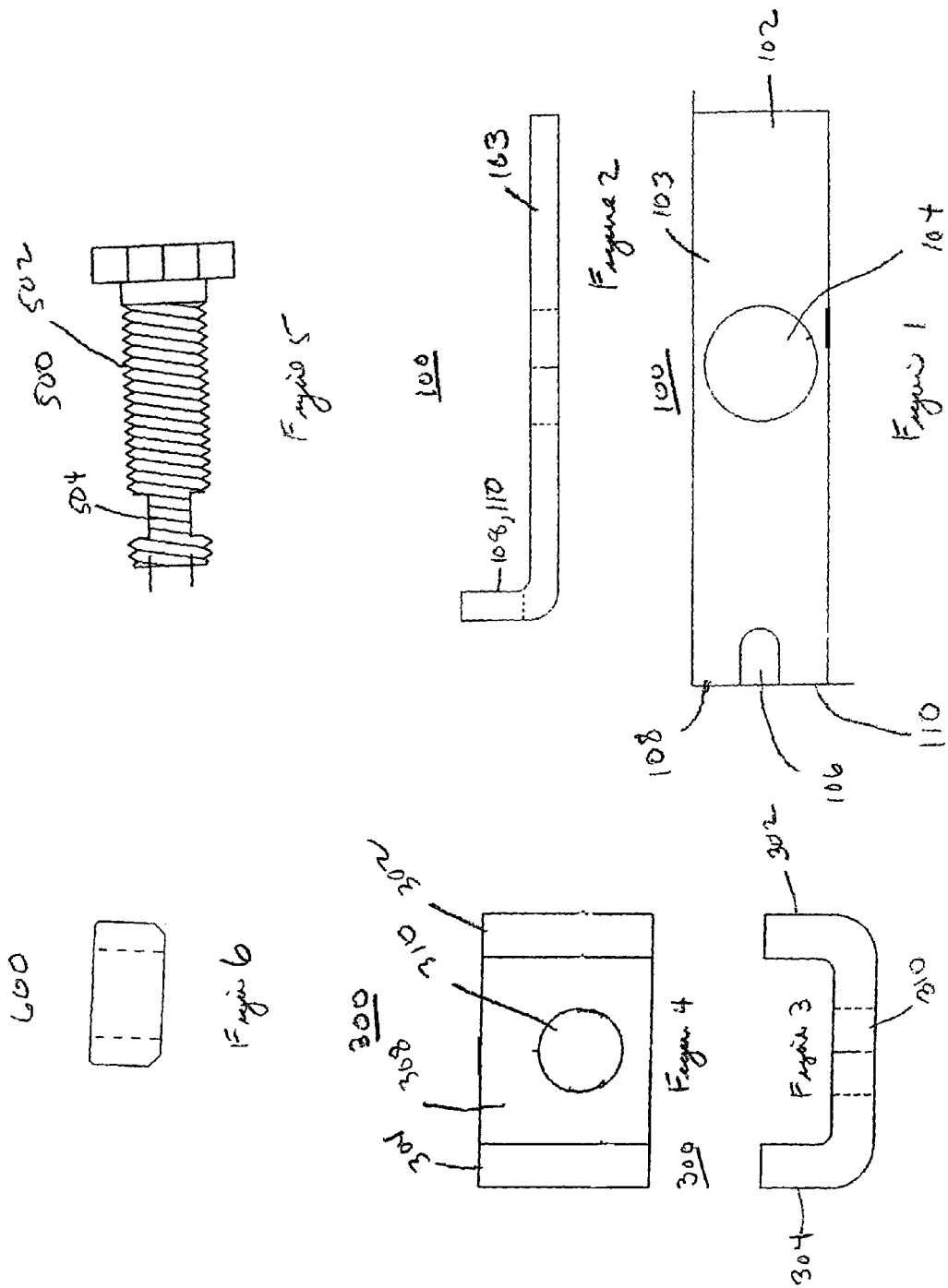

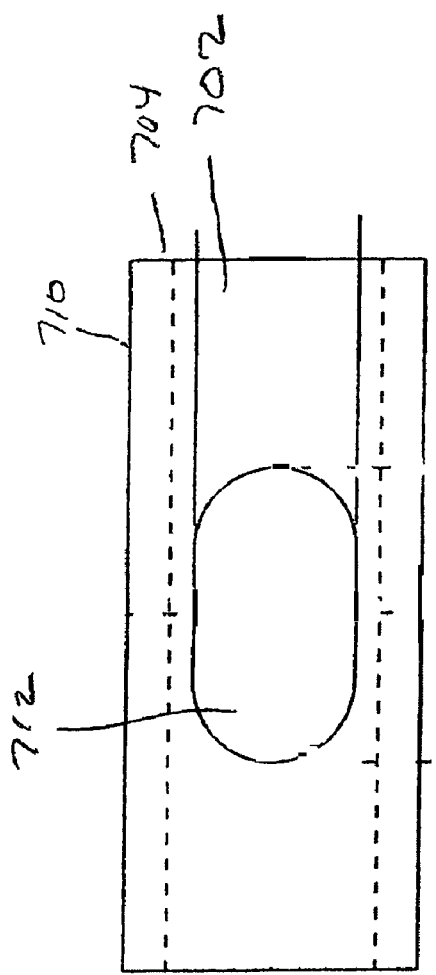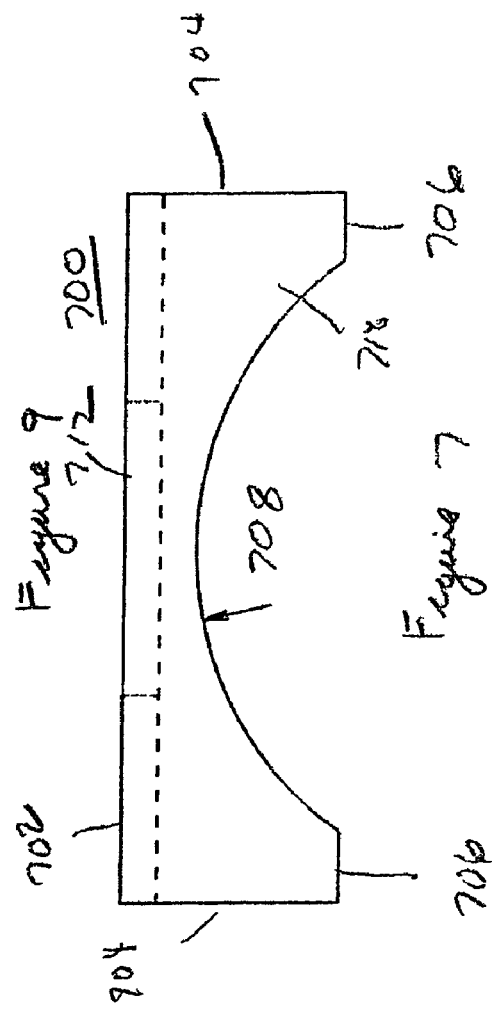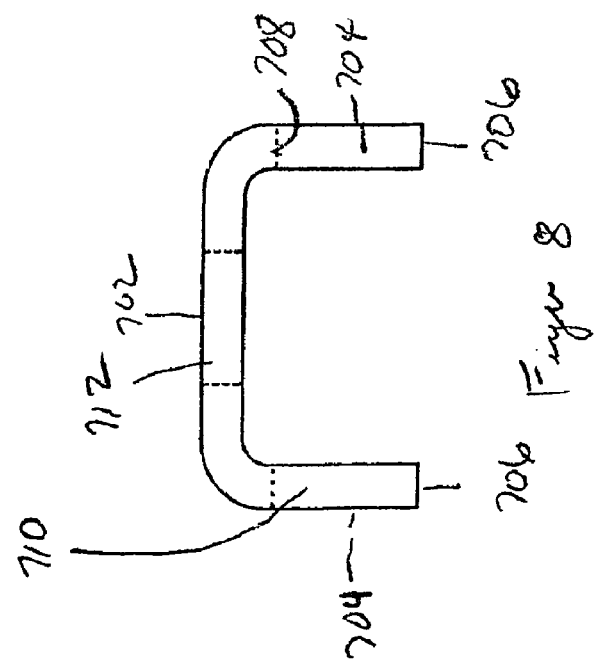

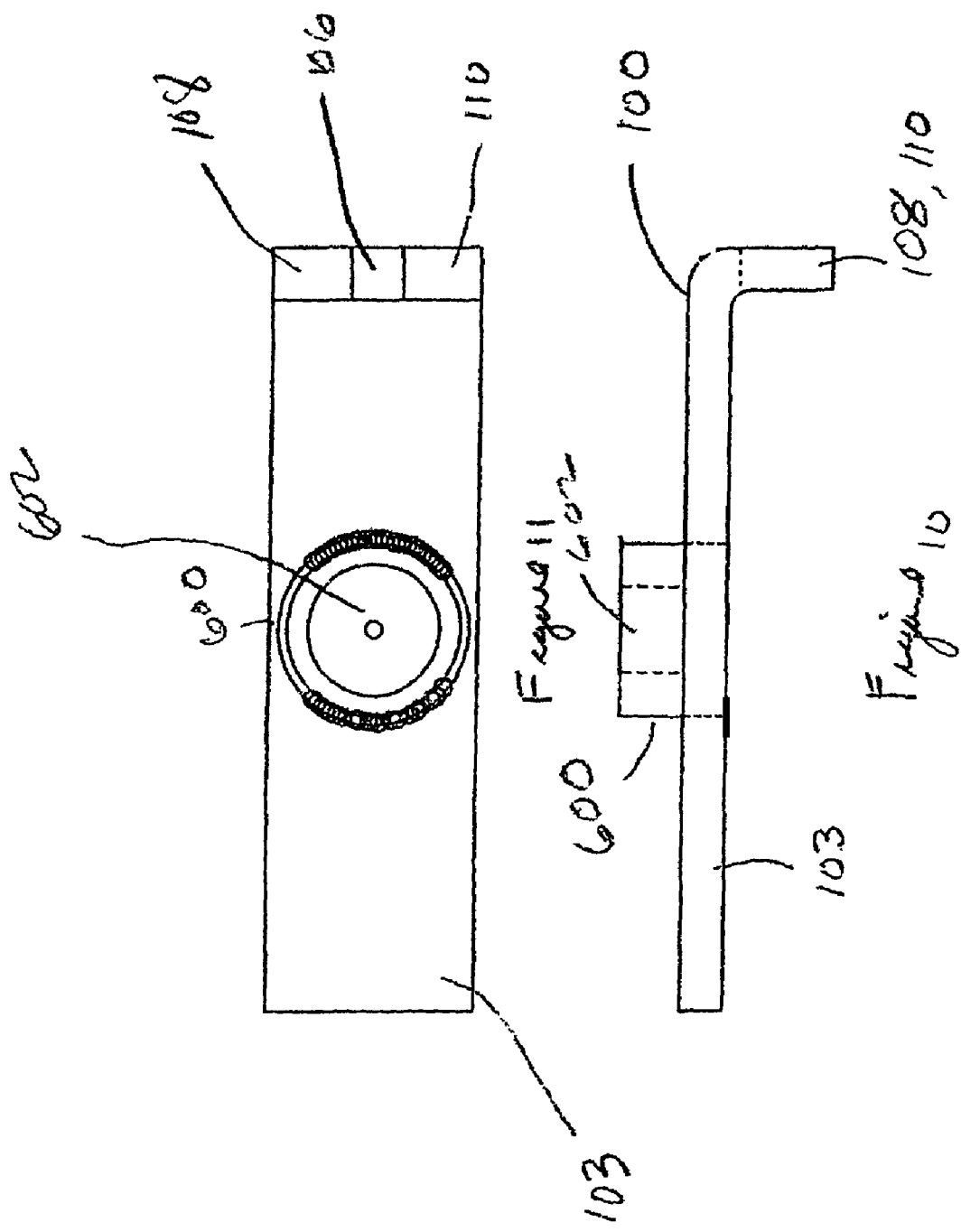

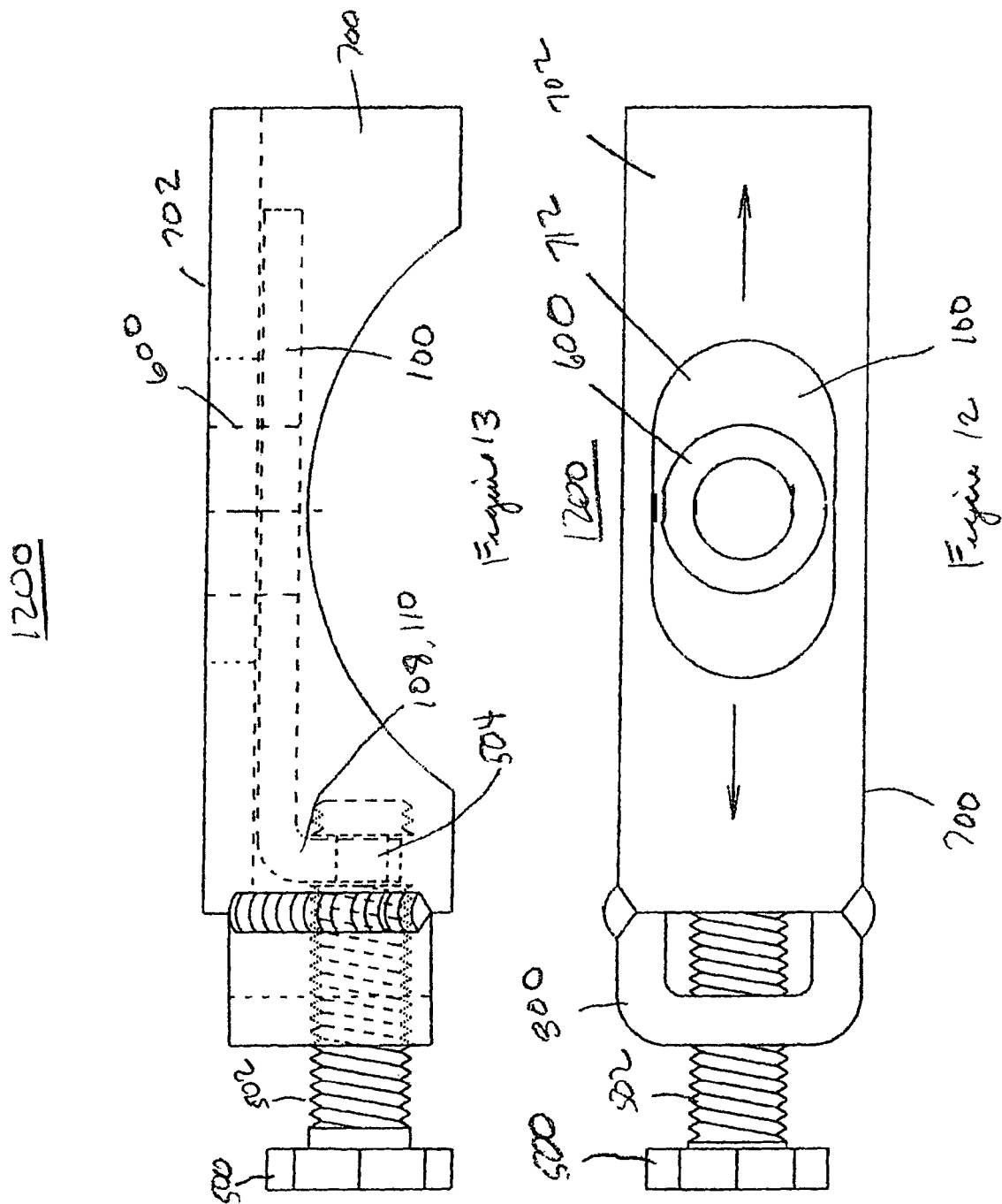

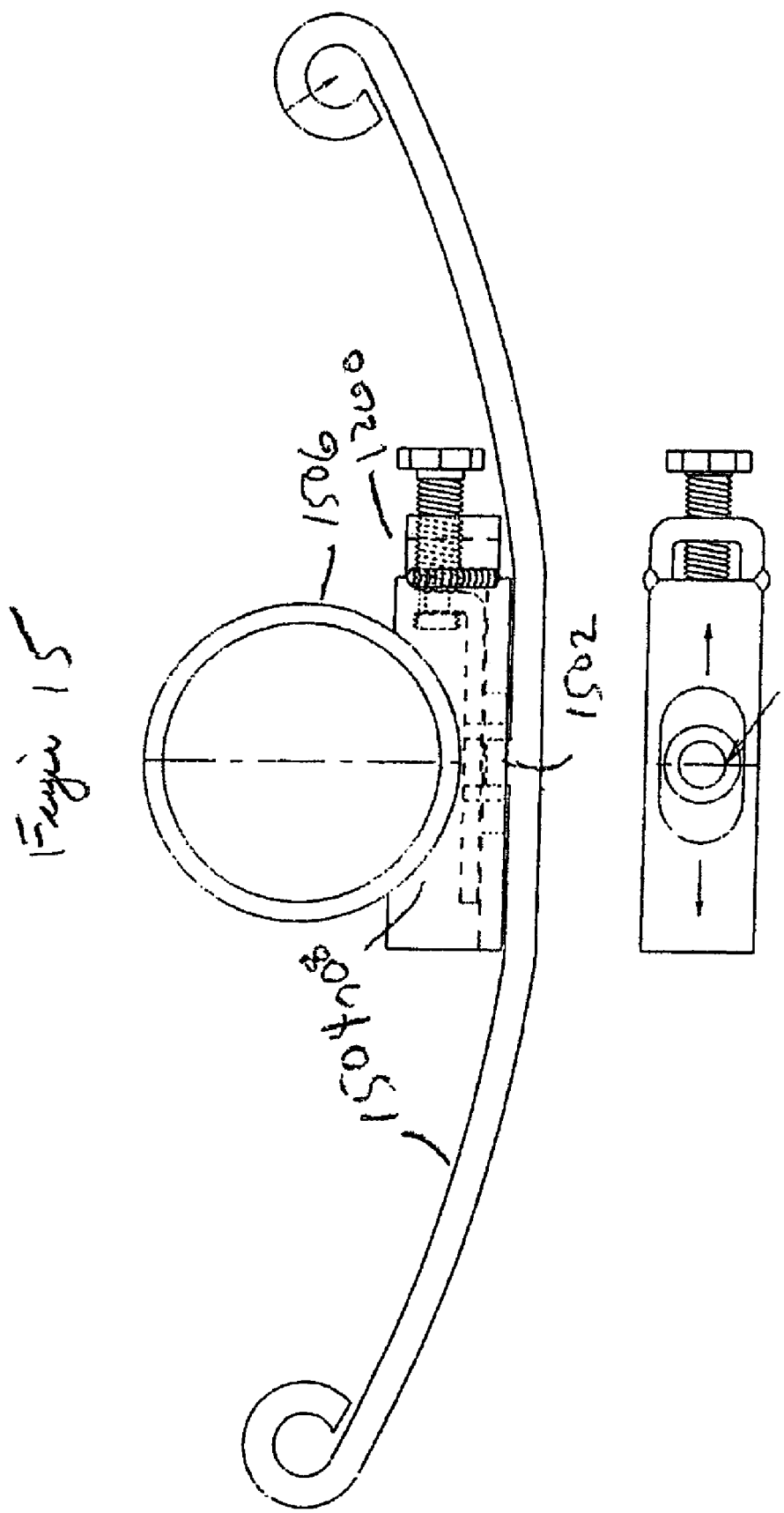

ADJUSTABLE SPRING PAD

BACKGROUND OF THE INVENTION

The present invention relates to a leaf spring suspension and, more particularly, to an apparatus of providing alignment between the spring and the axle housing to a vehicle mainframe.

Various conventional vehicle suspensions include a leaf spring fabricated from a series of superimposed steel leaves. Steel leaf springs may be disadvantageous because they are relatively heavy, noisy, and subject to corrosion.

Each leaf spring is typically located adjacent a longitudinal vehicle frame rail underneath the body of a truck or trailer chassis.

Manufactures of trailers in use of trailers have founded the difficult to make exact alignment between the axle of the vehicle and the trailer frame.

If this alignment is not correct then the trailer may pull sideways which could create excessive wear. In the past to correct this problem, the spring pad was physically removed, the axle was realigned to the frame and a replacement spring pad was welded in place.

SUMMARY

The nonadjustable spring pad is replaced with an adjustable spring pad, allowing the spring pad to be adjusted to insure alignment between the spring and frame. A biasing apparatus for screw can be used to easily change the alignment.

An apparatus for aligning a spring and axle may include an adjusting bar member for connecting to the spring, a spring pad member for connecting to the axle and a biasing member for biasing the adjusting bar member in a first and second direction.

The biasing member may include a threaded bolt, and the biasing member may include a bracket.

The biasing member may include a reduced diameter member, and the bracket may include a first arm and a second arm.

The adjusting bar member may be substantially L-shaped, and the adjusting bar member may include a first guiding member and a second guiding member.

The adjusting bar member may include a slot between the first and second guiding members, and the spring pad member may include a concave curved surface to cooperate with the axle housing.

BRIEF DESCRIPTION OF THE DRAWINGS

The invention may be understood by reference to the following description taken in conjunction with the accompanying drawings, in which, like reference numerals identify like elements, and in which:

FIG. 1 illustrates a top view of the adjusting bar member of the present invention;

FIG. 2 illustrates a side view of the adjusting bar member of the present invention;

FIG. 3 illustrates a side view of the bracket member of the present invention;

FIG. 4 illustrates a top view of the bracket member of the present invention;

FIG. 5 illustrates a side view of the biasing member of the present invention;

FIG. 6 illustrates a side view of the bushing member of the present invention;

FIG. 7 illustrates a side view of the spring pad member of the present invention;

FIG. 8 illustrates an end view of the spring pad member of the present invention;

FIG. 9 illustrates a top view of the spring pad member of the present invention;

FIG. 10 illustrates a side view of the adjusting bar member and bushing member of the present invention;

FIG. 11 illustrates a top view of the adjusting bar member and bushing member of the present invention;

FIG. 12 illustrates a top view of the adjustable spring pad of the present invention;

FIG. 13 illustrates a side view of the adjustable spring pad of the present invention;

FIG. 14 illustrates a top view of the adjustable spring pad of the present invention;

FIG. 15 illustrates a side view of the adjustable spring pad and a spring.

DETAILED DESCRIPTION

FIG. 1 illustrates the adjusting bar member 100 to adjust the position of the adjustable spring pad. Unless otherwise noted, the members of the present invention are formed from rigid materials. The adjusting bar member 100 includes a base member 102 which is shown as substantially L shaped, and the base member 102 includes an aperture 104 and a slot 106 which is substantially centered in the longitudinal member 103 and which is in the longitudinal direction of the longitudinal member 103 of the base member 102. The base member 102 includes a first guiding member 108 and a second guiding member 110 which are defined by the slot 106 to guide the biasing member 500.

FIG. 2 illustrates a side view of the adjusting bar member 100 which includes the longitudinal member 103 and the first and second guiding member 108, 110.

FIG. 3 illustrates a side view of the bracket member 300 which is substantially U shaped and includes a first arm member 302 and a second arm member 304. The bracket member 300 additionally includes a connecting member 308 to connect the first arm member 302 and the second arm member 304. The connecting member 308 includes an aperture which may include internal threads to cooperate with the biasing member 500.

FIG. 4 illustrates a top view of the bracket member 300 and shows the first arm member 302, the second arm member 304 and the connecting member 308 with an aperture 310.

FIG. 5 illustrates a side view of a biasing member 500 which biases the adjustable spring pad and includes external thread 502 and a reduced diameter portion 504. The reduced diameter portion 504 cooperates with the slot 106, the first guiding member 108 and the second guiding member 110 to 2 move the adjusting bar member 100. FIG. 5 illustrates that the biasing member 500 may be formed from a bolt.

FIG. 6 illustrates a side view of a bushing member 600 which may be formed as a cylinder and include a center aperture 602.

FIG. 7 illustrates a side view of a spring pad member 700 which includes a top surface 702, an end surface 704, a bottom surface 706 which includes the concave curved surface 708 for cooperating with axle housing and front and back surfaces 710.

FIG. 8 illustrates an end view of the spring pad member 700 and shows the top surface 702, the end surface 704, the bottom surface 706 and the concave curved surface 708 (in phantom line).

FIG. 9 illustrates a top view of the spring pad member 700 and shows the top surface 702, the end surface 704 and the front and back surfaces 710. FIG. 9 additionally illustrates the passageway 712 formed within the top surface 702 for cooperation with the bushing member 600.

FIG. 10 illustrates the side view of the bushing member 600 affixed to the adjusting bar member 100 with the aperture 602 aligned with the aperture 104 of the adjusting bar member 100.

FIG. 11 illustrates a top view of the bushing member 600 affixed to the adjusting bar member 100. FIG. 11 illustrates the first guiding member 108 and the second guiding member 110 adjacent to the slot member 106.

FIG. 12 illustrates a top view of the adjustable spring pad apparatus 1200 of the present invention. FIG. 12 illustrates that the bushing member 600 which is affixed to the adjusting bar member 100 can travel within the passageway 712 in substantially the longitudinal direction in accordance with the biasing member 600. By turning the biasing member 600, the biasing member 600 moves the adjusting bar member of 100 and the bushing member 600 with respect to the spring pad member 700. The bracket member 300 includes internal threads (not shown) within the aperture 310 to cooperate with the external threads 502 of the biasing member 500.

FIG. 13 illustrates a side view of the adjustable spring pad apparatus 1200 and shows the adjusting bar member 100 positioned under the top surface 702 of the spring pad member 700 and between the front and back surface 710.

FIG. 14 illustrates a top view of the adjustable spring pad of the present invention and shows that the aperture 602 of the bushing member 600 can receive the locating button of the spring pad.

FIG. 15 illustrates the spring 1504, the adjustable spring pad 1200 and the axle housing 1506 of the vehicle. FIG. 15 shows that the concave curved surface 708 cooperates with the axle housing 1506 of the vehicle so that the spring 1504 moves in the longitudinal direction of the adjustable spring pad, both forwards and backwards with respect to the axle housing 1506 when the biasing member 500 is rotated. Consequently, if the axle housing 1506 is not aligned correctly with the spring 1504, the biasing member 500 moves the adjusting bar member 100 and the bushing member 600 which is connected to the spring 504 by virtue of the locating button 1502 of the spring 1504.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. An apparatus for aligning a spring and axle, comprising:
   An L shaped adjusting bar member for transmitting force applied at one end by a threaded biasing member through to and engaging against a locating button of a spring member;
   a three sided spring pad member for connecting to the axle;
   a bracket secured to one end of said spring pad member and positioning said threaded biasing member in juxtaposition to said L shaped adjusting bar member;
   said threaded biasing member for biasing the L shaped adjusting bar member in a first and second direction;
   a reduced diameter section along the length of said threaded biasing member for connecting to said L shaped adjusting bar member;
   a bushing member affixed to said L shaped adjusting bar member and accommodating said location button of said spring member;
   a passageway in said spring pad member to accommodate movement of said bushing member.

* * * * *